Nov. 8, 1927.

O. LARSEN

VALVE

Filed Jan. 22, 1925

1,648,486

Inventor
Olaf Larsen

Patented Nov. 8, 1927.

1,648,486

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

VALVE.

Application filed January 22, 1925. Serial No. 3,926.

The invention relates to valves for the control of the flow of edible fluids, and known as sanitary valves.

In the preparation of milk for food consumption, one of the processes employed is Pasteurization, by which the pathogenic bacteria are destroyed. The generally accepted method of Pasteurization is to hold quantities of milk at a predetermined temperature for a predetermined time in insulated or heated containers of large capacity. The milk is ordinarily treated in successive batches, the containers being filled and emptied through sanitary piping controlled by sanitary valves positioned at the inlets and outlets of the containers. It will be obvious that any leakage or failure in these valves will permit the uncontrolled flow through the container of a quantity of milk which has not been held for the required time at the necessary temperature. If such leakage is permitted to pass into the discharge conduits with the properly Pasteurized milk, the latter is in danger of reinoculation by the undestroyed bacteria in the milk which has escaped the prescribed treatment.

Also, it is obviously necessary that all containers, piping and controlling valves used in the treatment of milk for food consumption be kept in a sanitary condition. This requires that such apparatus be constructed so that the parts may be readily dis-assembled for thorough cleaning after their operative use.

It is the principal object of this invention to provide an improved sanitary valve which is constructed to direct outwardly from the main passages any leakage occurring in the valve when it is in closed position, and especially adapted to wholly drain the valve chamber of such leakage when operating on a substantially vertical axis, as when controlling a downwardly opening outlet. A further object is to provide a valve of simple construction having few parts which may be conveniently and quickly taken down for cleaning.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claim.

Figure 1:
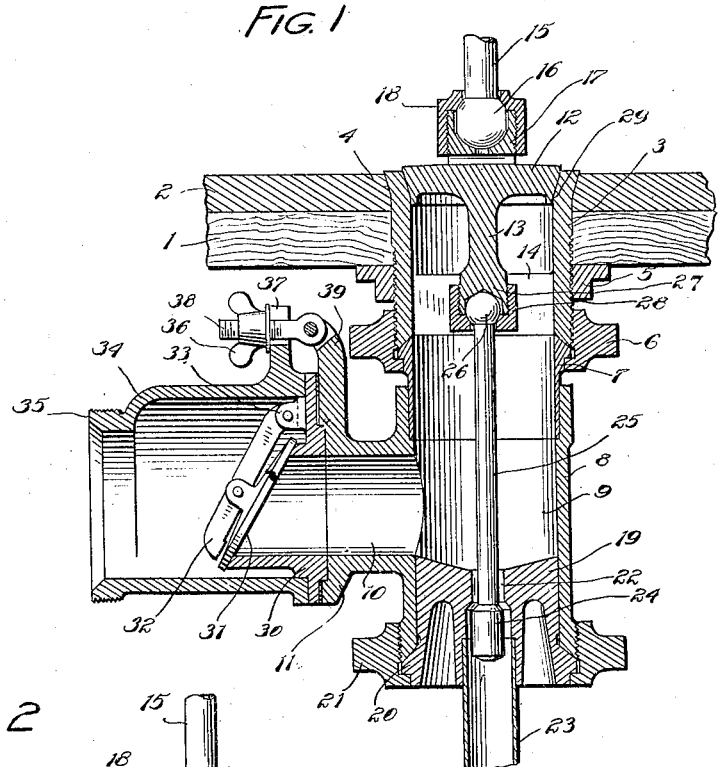
Figure 2:
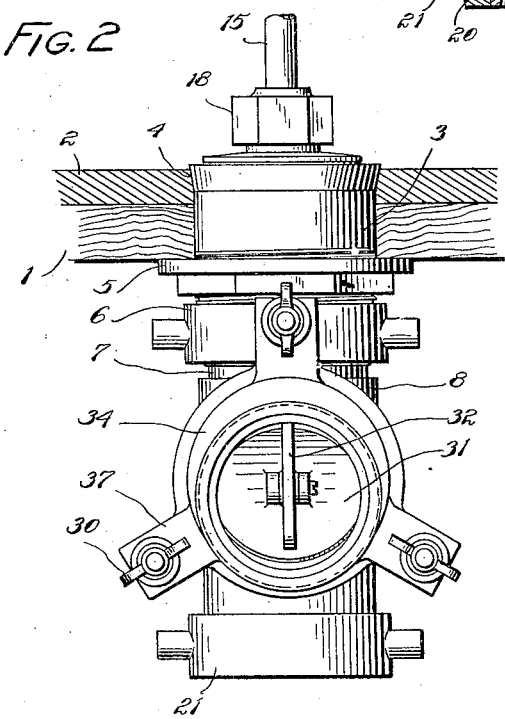

Referring to the drawings, Fig. 1 is a sectional side elevation of the valve, and Fig. 2 is a front elevation of the same. The reference numeral 1 indicates the bottom wall of a Pasteurizing holder having an inner lining 2. A tube 3 extends through the wall 1 and lining 2 and opens into the interior of the holder, forming a downward discharge outlet for the contents of the holder. The preferably flared upper end of the tube 3 engages a tapered seat 4 in the lining in substantially flush relation thereto, and is preferably secured in position by means of a flanged nut 5 threaded upon the lower portion of the tube 3 and bearing upon the wall 1. The threaded lower end of the tube 3 carries a union nut 6 by means of which a sleeve 7 is detachably secured to the tube 3 in continuation of the passage therethrough.

The sleeve 7 is rigidly attached to and carries a casing 8 having a chamber 9 opening upwardly in communication with the passage through the tube 3 and sleeve 7, and opening laterally into the passage 10 formed in a lateral extension 11 of the casing. The passage through the tube 3 is controlled by a valve 12 at its upper end having its seat in the flared end of the tube and having a depending web 13 from which extend guide arms 14 having sliding engagement with the inner surface of the tube. The valve 12 is operated by a rod 15 extending upwardly into position for manual or mechanical manipulation, and preferably having a flexible connection with the valve, herein illustrated as comprising a ball member 16 at the end of the operating rod seated in a socket 17 mounted on the upper face of the valve and operatively secured therein by a retaining nut 18.

The casing 8 is constructed preferably with an open lower end into which is removably fitted a closure plug 19 having a flanged lower end 20 abutting the end of the casing and secured in position by the union nut 21. The upper surface of the plug 19 forms the bottom of the chamber 9, and is radially inclined inwardly to form a sump for the accumulation of any leakage, at the center of which opens a passage 22 extending down through the plug and preferably communicating with a leakage discharge pipe 23. The sump formed in the upper face of the closure plug 19 extends downwardly from the outlet 10 to receive any back-flow leakage from the outlet as well as leakage from the inlet.

The passage 22 is controlled by a valve 24 dimensioned to slidably enter the constricted upper portion of the passage and effect the closure thereof. The valve 24 is operatively supported by a stem 25 having a preferably flexible connection with the under structure of the valve 12, herein illustrated as comprising a ball 26 carried on the upper end of the stem, the ball being seated in a socket 27 formed in the web 13 and operatively secured in position by a retaining nut 28. The stem 25 is of such length that when the valve 12 is seated in closed position, the valve 24 is suspended in the enlarged lower portion of the passage 22, leaving the latter open for the free escape of any leakage of liquid past the valve 12 which flows down into the sump at the bottom of the chamber 9. When the valve 12 is operatively raised from its seat, a depending cylindrical flange 29 maintains the closure of the tube 3 until the valve 24 is drawn up into the constricted portion of the passage, effecting the closure of the latter against the loss of any liquid passing normally through the valve casing when the valve 12 is fully open.

In the embodiment of the invention herein disclosed, the main outlet passage 10 is also valve-controlled. The outer end of the casing extension 11 is formed with a recessed flange upon which is removably supported a valve seat ring 30, its aperture continuing the passage 10. The outer face of the ring 30 is preferably angularly disposed to a vertical plane, and forms a seat for a check valve 31. The latter is pivotally supported on an arm 32 which is hinged to a bifurcated lug 33 formed on the upper portion of the ring 30. The ring 30 and check valve 31 are enclosed in a shell 34, the outer end of which is preferably formed as at 35 suitably for union connection with piping to carry away the liquid discharged through the valve structure. The shell 34 and ring 30 are removably secured to the casing extension 11 by means of thumb-nuts 36 bearing upon bifurcated radial lugs 37 formed on the shell 34, the thumb-nuts being threaded on swinging eye-bolts 38 pivoted on radial arms 39 formed integrally with the casing extension 11, the ring 30 being provided with an outer flange extending between the shell and the face of the casing extension.

The check valve 31, with its seat ring and enclosing shell, may be dispensed with when the valve structure is employed in such arrangement of the discharge piping that there is no possibility of back flow, as in controlling the filling of a vat or holder from above the level of the liquid in the vat. In such case any leakage from the valve 12 after it has been closed, will flow into the passage at the bottom of the chamber 9 as before described, and not be admitted to the holder after the prescribed period of holding time has begun to run.

I claim as my invention:

A device of the class described, comprising a casing having a chamber with an upward inlet opening and a lateral outlet opening and with a downward passage opening from said chamber substantially opposite to said inlet opening, a valve controlling said outlet opening, a valve operatively seated outwardly of and controlling said inlet opening and having a pendent portion extending into said chamber to guide the movement of said inlet valve, a stem depending from the pendent portion of said inlet valve through said passage and secured to said pendent portion suitably for universal lateral movement of the free end of said stem, and a valve mounted on the free end of said stem normally positioned outwardly of said passage and adapted to control said passage, said passage valve being arranged to enter said passage and effect a closure thereof with the opening movement of said inlet valve and to pass outwardly of said passage with the opening of said inlet valve.

In witness whereof I have hereunto attached my signature.

OLAF LARSEN.